March 26, 1935. T. V. BUCKWALTER 1,995,835
CONNECTING ROD
Original Filed Nov. 4, 1932
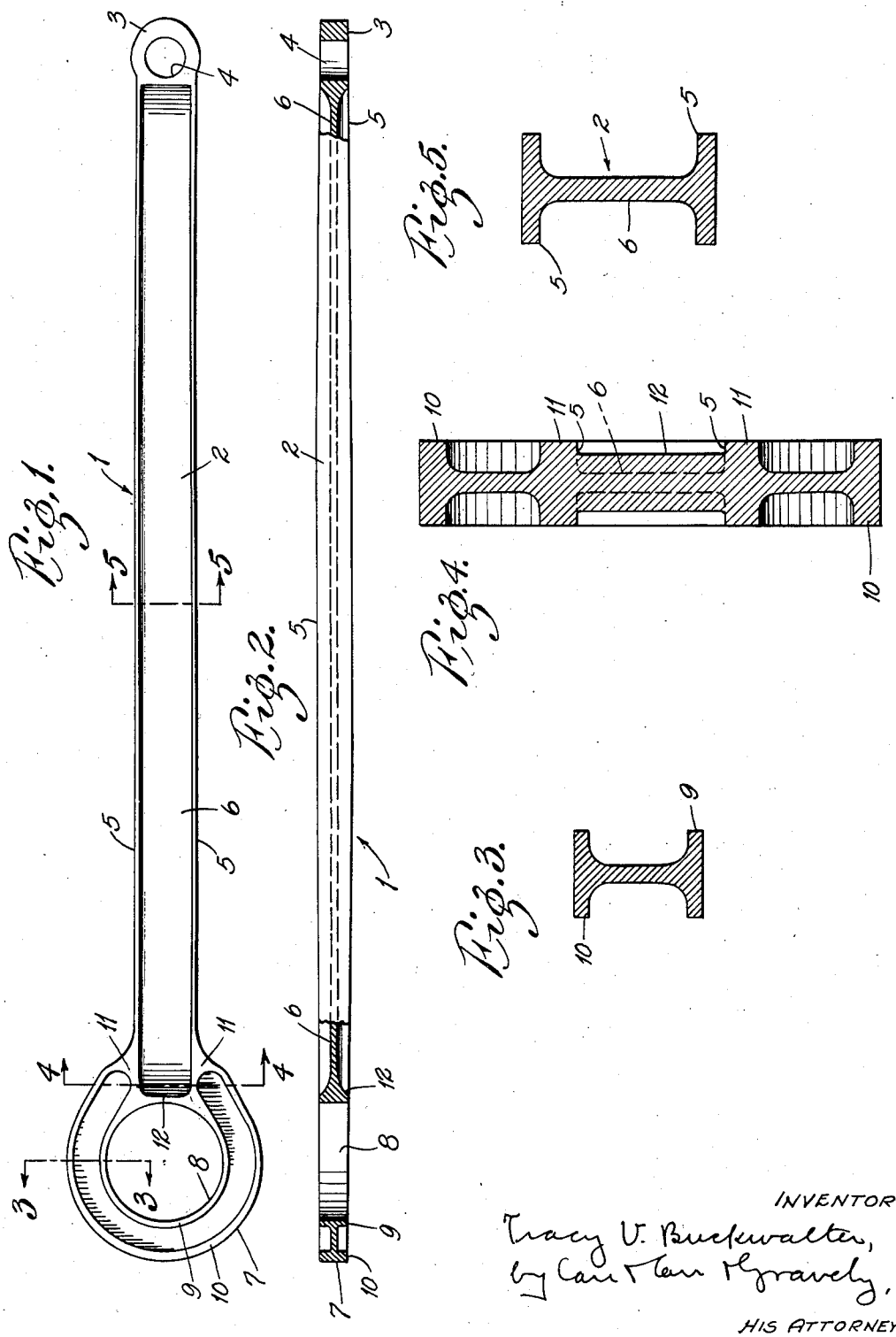
INVENTOR:
Tracy V. Buckwalter,
by Cushman Darby Gravely
HIS ATTORNEYS.

Patented Mar. 26, 1935

1,995,835

UNITED STATES PATENT OFFICE 1,995,835

CONNECTING ROD

Tracy V. Buckwalter, Canton, Ohio, assignor to The Timken Roller Bearing Company, Canton, Ohio, a corporation of Ohio Application November 4, 1932, Serial No. 641,136
Renewed November 20, 1933

5 Claims. (Cl. 74—579)

My invention relates particularly to main connecting rods for locomotives. Present day locomotives are made extremely powerful; and the main rod, which transmits the powerful thrusts of the piston to the crank pin, is subjected to severe bending stresses occasioned by such thrusts; and these bending stresses are extremely severe at the crank pin end of the rod and are constantly varying during the operating of the rod due to the reciprocating movement thereof and to the movement of the crank pin about the wheel axis. Accordingly, it is a difficult problem to provide main rods for locomotives which are strong enough to withstand such severe bending stresses and which are still light enough that the proper amount of rod counterbalance on the wheels can be obtained; and the invention has for its principal object to provide a main rod for a locomotive which is strong enough to withstand the stresses encountered at the crank pin end of the rod and which is light enough that there is no difficulty in obtaining the proper amount of rod counterbalance on the wheel. A further object is to provide a rod which is comparatively inexpensive to make.

The invention consists principally in a connecting rod which has a shank portion comprising top and bottom flanges, and which rod has an enlarged crank pin end portion that is provided with an annular hub flange around its crank pin opening and that is provided with a peripheral rim flange, which hub and rim flanges are connected to the shank flanges of the rod. The invention further consists in the connecting rod, and in the parts hereinafter described and claimed.

In the accompanying drawing which forms part of this specification and wherein reference symbols refer to like parts wherever they occur, Fig. 1 is a side view of a locomotive main connecting rod embodying my invention, Fig. 2 is a plan view of the rod with the ends shown in section, Fig. 3 is a sectional view on the line 3—3 in Fig. 1, Fig. 4 is a sectional view on the line 4—4 in Fig. 1, and Fig. 5 is a sectional view on the line 5—5 in Fig. 1.

In the accompanying drawing is shown a connecting rod 1 embodying my invention. The rod 1 is of integral construction and comprises a shank or body portion 2 which is generally I-shaped in cross-section. The rod is, preferably, widest along its middle portion and tapers slightly towards the ends. The cross head pin end 3 of the rod is of conventional shape and has the usual cross head pin opening 4 therethrough.

The shank portion 2 of the rod, which is made up of top and bottom flanges 5 connected by a central vertical web 6, has an enlarged crank pin end portion 7 which is provided with an opening 8 therethrough for receiving a crank pin. The crank pin opening is defined by an annular hub flange 9 of substantially even width with that of the flanges of the shank portion of the rod, and said end portion 7 also has a peripheral rim flange 10 which merges into the upper and lower shank flanges and is of substantially even width therewith. The shank flanges 5 of the rod are extended forwardly beyond the points at which the peripheral rim flange 10 merges into them, and the forwardly extended portions 11 of the shank flanges connect with and merge into the annular hub flange around the crank pin opening of the rod. The web 6 of the shank portion of the rod is widened out as at 12 as it joins with the hub flange around the crank pin opening to further strengthen the rod.

With the rod hereinabove described, the thrust forces of the piston are transmitted through the annular hub flange 9 and to the bearing without being transmitted through the web of the shank portion of the rod; and the peripheral rim flange 10 around the crank pin opening further reinforces the crank pin end portion of the rod to prevent distortion thereof due to the alternating compression and tensile stresses imposed upon the section of the rod around the pin opening. Furthermore, as the peripheral rim flange merges into the top and bottom flanges of the shank portion of the rod, it will receive a portion of the stresses occasioned by the piston thrust directly from the top and bottom flanges of the shank portion of the rod and will thus relieve the hub flange around the crank pin opening of some of the stresses encountered.

With my rod, due to the novel shape of the crank pin end, it is able to withstand the severe stresses encountered, and still it is light enough that there is no difficulty in providing the proper rod counterbalance on the wheel. Furthermore, a rod embodying my invention can be readily drop-forged in one piece and finished with an end mill at a comparatively small cost. Due to the continuity of configuration in the shape of the rod, dies needed therefor in the drop-forging process are comparatively inexpensive to make; and, accordingly, the cost of the rod is comparatively low.

What I claim is:

1. A locomotive connecting rod of integral construction having a shank portion and an enlarged end portion provided with an opening therethrough defined by an annular flange, said shank portion adjacent to the enlarged end portion being generally I-shaped in cross-section, said end portion having a peripheral flange which merges into the shank flanges of the rod, and the flanges of said shank portion merging into the annular flange defining the opening through the enlarged end portion of the rod.

2. A locomotive connecting rod having a shank portion comprising an upper and lower flange and having an enlarged end portion provided with an opening therethrough defined by an annular flange, said end portion having a peripheral flange which merges into the shank portion flanges of the rod, and said shank flanges merging into the annular flange defining the opening through the enlarged end portion of the rod.

3. A locomotive connecting rod having a shank portion comprising top and bottom flanges connected by a web, said rod having an enlarged crank pin end portion provided with an opening therethrough defined by an annular hub flange, said enlarged end portion having a peripheral rim flange which merges into the top and bottom flanges of the shank portion of the rod, and the shank portion flanges of the rod extending beyond the points at which the peripheral flange of the enlarged end portion merges into them and merging into the hub flange defining the opening through the enlarged end portion of the rod.

4. A locomotive connecting rod of integral construction having a shank portion comprising top and bottom flanges connected by a web, said rod having an enlarged crank pin end portion provided with a crank pin opening therethrough defined by an annular hub flange of substantially even width with that of the shank flanges, said crank pin end portion having a peripheral rim flange of substantially even width with that of the hub flange and which peripheral flange merges into the top and bottom flanges of the shank portion of the rod, the flanges of the shank portion of the rod extending beyond the points at which the peripheral rim flange of the enlarged end portion merges into them and merging into the hub flange of the crank pin end portion, and the web of the shank portion of the rod being widened out as it merges into the hub flange of the crank pin end portion of the rod.

5. A locomotive connecting rod comprising a shank portion provided with longitudinal side flanges, an enlarged end portion having an opening defined by an annular inner flange, and an outer flange defining the periphery of said enlarged end portion and merging into the outer faces of the respective longitudinal side flanges of said shank portion, said longitudinal side flanges extending beyond their points of connection with said outer flange and merging into said annular inner flange.

TRACY V. BUCKWALTER.